US012697614B2

(12) United States Patent
Elangovan et al.

(10) Patent No.: US 12,697,614 B2
(45) Date of Patent: Aug. 4, 2026

(54) MICROFLUIDIC ANALYSER FOR IN-VITRO BIOSENSING AND DIAGNOSTICS

(71) Applicant: INDIAN INSTITUTE OF TECHNOLOGY DELHI, New Delhi (IN)

(72) Inventors: Ravikrishnan Elangovan, New Delhi (IN); Allanki Sai Swaroop, New Delhi (IN); Prabhu Balasubramanian, New Delhi (IN); Tushar Jeet, New Delhi (IN); Ada Zwetlana, New Delhi (IN)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 573 days.

(21) Appl. No.: 18/039,154

(22) PCT Filed: Nov. 26, 2021

(86) PCT No.: PCT/IN2021/051106
§ 371 (c)(1),
(2) Date: May 26, 2023

(87) PCT Pub. No.: WO2022/113113
PCT Pub. Date: Jun. 2, 2022

(65) Prior Publication Data
US 2024/0001359 A1 Jan. 4, 2024

(30) Foreign Application Priority Data
Nov. 27, 2020 (IN) ............................ 202011051838

(51) Int. Cl.
*B01L 3/00* (2006.01)

(52) U.S. Cl.
CPC ......... *B01L 3/502715* (2013.01); *B01L 3/502* (2013.01); *B01L 3/5027* (2013.01); (Continued)

(58) Field of Classification Search
None
See application file for complete search history.

(56) References Cited

U.S. PATENT DOCUMENTS 6,319,469 B1 * 11/2001 Mian .................. B01L 3/50273 422/63
11,684,918 B2 * 6/2023 Nielsen ........... G01N 27/44743 422/417
(Continued)

OTHER PUBLICATIONS

Indian Institute of Science, Bangalore, Karnataka, India, "A Microscopy System and a Method for Analyzing Fluids," IN-CHE-2014-02432A, Complete Specification, 33 pages, Jan. 15, 2016.

*Primary Examiner* — Neil N Turk
(74) *Attorney, Agent, or Firm* — Seed Intellectual Property Law Group LLP

(57) ABSTRACT

Examples of a microfluidic analyser (100, 200A, 200B, 200C) for in-vitro biosensing and analysis of a biological sample are described. The microfluidic analyser comprises a platform (102, 202A, 202B, 202C, 402A, 402B, 500) to hold at least one cartridge (300) carrying a biological sample and at least one reagent. The microfluidic analyser includes a fluid control unit (108, 1000) having needles (110, 1002, 1102) to pierceably connect with sealed ends (304) of the cartridge to establish a fluid connection with the cartridge, and a pneumatic unit (112, 1004, 1202) to provide at least one of a positive pressure and a negative pressure to the cartridge. The microfluidic analyser includes an optical unit (104, 600) comprising an optical sensor (124, 604, 800) to detect presence of a fluorescence biomarker in biological sample held in the cartridge.

16 Claims, 12 Drawing Sheets

(52) U.S. Cl.
CPC ..... *B01L 3/50273* (2013.01); *B01L 3/502738* (2013.01); *B01L 3/502746* (2013.01); *B01L 2200/025* (2013.01); *B01L 2200/027* (2013.01); *B01L 2200/16* (2013.01); *B01L 2300/021* (2013.01); *B01L 2300/0663* (2013.01); *B01L 2300/0672* (2013.01); *B01L 2300/1827* (2013.01); *B01L 2400/0487* (2013.01); *B01L 2400/0666* (2013.01); *B01L 2400/082* (2013.01)

(56) References Cited

U.S. PATENT DOCUMENTS

| | | | | |
|---|---|---|---|---|
| 2002/0033193 | A1* | 3/2002 | McNeely | F15C 1/146 137/825 |
| 2004/0248284 | A1* | 12/2004 | van Beuningen | B01L 7/00 435/6.1 |
| 2005/0003522 | A1* | 1/2005 | Carlsen | B01L 9/52 702/19 |
| 2007/0292941 | A1* | 12/2007 | Handique | B01L 3/502715 435/287.1 |
| 2015/0093815 | A1 | 4/2015 | Kiani et al. | |
| 2015/0224499 | A1* | 8/2015 | Wang | B01L 3/502715 435/7.1 |
| 2017/0014822 | A1* | 1/2017 | Ker | G01N 27/3272 |
| 2019/0212233 | A1* | 7/2019 | Jovanovich | C12N 1/06 |

* cited by examiner

MICROFLUIDIC ANALYSER FOR IN-VITRO BIOSENSING AND DIAGNOSTICS

TECHNICAL FIELD

The present subject matter relates, in general, to in-vitro biosensing and analysis of biological samples, and particularly but not exclusively relates to a microfluidic analyser for in-vitro biosensing and analysis of a biological sample.

BACKGROUND

In-vitro biosensing, analysis, and diagnostics play an important role in medical decision-making process. An in-vitro biosensing, analysis, and diagnostics process includes performing bioassays of a biological sample, such as blood, saliva, etc., taken from a subject. Examples of bioassays includes, but are not limited to, electrochemical assays, nucleic acid tests, enzyme activity assays, cell-based assays, and immunoassays. In the bioassays, various pre-treatment process steps may be involved, in which various reagents and other pre-treatment solutions may be introduced in an assay for pre-treatment of the biological sample.

BRIEF DESCRIPTION OF DRAWINGS

The features, aspects, and advantages of the subject matter will be better understood with regard to the following description and accompanying figures. The use of the same reference number in different figures indicates similar or identical features and components.

DETAILED DESCRIPTION

Figure 1:
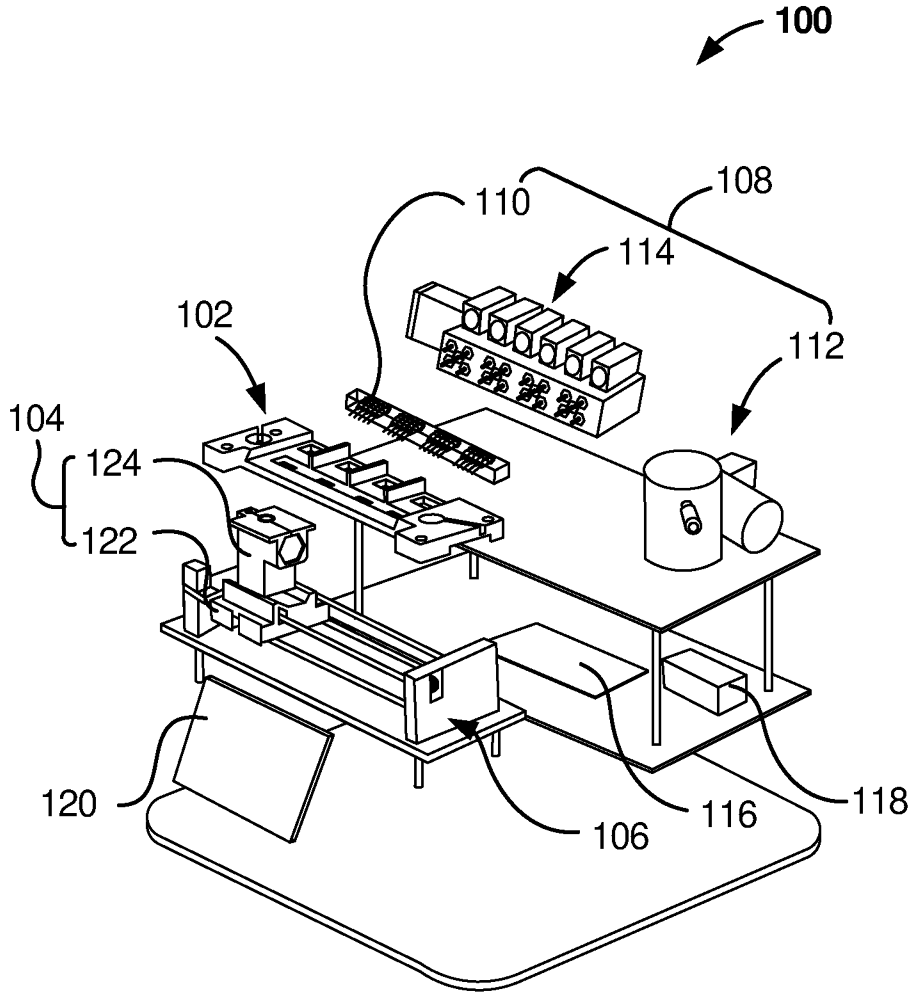
FIG. 1 illustrates an exploded view of a microfluidic analyser, in accordance with an implementation of the present subject matter.

Generally, an in-vitro biosensing process of a biological sample has three stages including sample processing, sample enrichment, and sample detection. In all the three stages, the biological sample, typically a liquid sample, is manually handled using high precision liquid handling systems, such as pipettes. Such manual handling of samples by a user in different instances or by different users, may vary with a high degree, introducing undesired subjectivity to the biosensing and diagnostics processes. Further, to eliminate or reduce the degree of subjectivity, the user may be required to use the liquid handling systems precisely, which increases an overall time required for performing the biosensing and diagnostic processes. Thus, the conventional biosensing and diagnostics processes require extensive training of the user.

Moreover, handling of the biological sample is required to be done in a contained infrastructure, so as to reduce potential damages to a technician or a user involved. In addition, a detection technology being used has to be targeted towards a specific biomarker from the biological sample while preventing false positive and false negative outcomes. Therefore, the conventional techniques extensively require specialized infrastructure and high precision equipment, which, in turn, increases the overall cost of performing biosensing and in-vitro diagnostics and analysis.

In this respect, various automated devices have been developed to carry out the biosensing and in-vitro diagnostics and analysis without manual intervention. However, the conventional devices for automated biosensing and in-vitro diagnostics and analysis are optimized to operate with lesser resources, such as various equipment, at a low resource setting. The conventional devices, involving high resource settings require centralized laboratories and involves implementation of specialized and bulky equipment.

In addition, the overall time taken for biosensing and diagnostics play a critical role in diagnosing a medical condition and initiating an appropriate treatment process in order to impart optimal clinical outcomes in a timely manner. However, the conventional devices, as well as the analysis reporting processing time-consuming which introduces a critical challenge in achieving optimal clinical outcomes in a timely manner.

The present subject matter relates to a device for processing a biological sample for detection and analysis of a biomarker. Examples of the biomarker may include, but are not limited to, protein, nucleotides, metabolites, and carbohydrates/lipids, immunosensors, deoxyribonucleic acid (DNA) bio-sensors, enzyme-based bio-sensors, tissue-based bio-sensors, and thermal bio-sensors. The microfluidic analyser of the present subject matter can simultaneously process multiple samples for bioassay. For example, the microfluidic analyser may perform a bioassay including, but not limited to, basic enzyme-linked immunosorbent assay (ELISA), DNA detection.

The microfluidic analyser of the present subject matter includes a platform, a fluid control unit coupled to the platform, and an optical unit operably coupled to the platform. The platform is configured to hold at least one cartridge carrying the biological sample and at least one reagent, for simultaneously performing in-vitro diagnostic evaluation. In an example, the at least one cartridge includes one or more sealed ends.

Further, the fluid control unit is configured to regulate flow of the biological sample and the at least one reagent inside the at least one cartridge. The fluid control unit may include one or more needles to pierceably connect with the one or more sealed ends of the at least one cartridge to establish a fluid connection with the at least one cartridge. The fluid control unit may also include a pneumatic unit, operably coupled to the one or more needles, to provide at least one of a positive pressure and a negative pressure to the at least one cartridge. In addition, the optical unit comprises an optical sensor to detect presence of a fluorescence biomarker in the biological sample held in the at least one cartridge.

In an example, the microfluid analyser also includes a linear guide mechanism, a controller, and a battery. The linear guide mechanism may be positioned below the platform and may enable movement of the optical unit to align the optical unit with the at least one cartridge. For example, in an event of simultaneous processing of multiple biological samples, the linear guide mechanism facilitates the optical sensor to be aligned below a specific cartridge.

Further, the controller may control the pneumatic unit to perform pre-processing of the sample. The controller may include a communication module to connect the microfluidic analyser with a remotely located centralized server, such as a cloud server. The controller may gather the bioanalysis and diagnostics results from the optical unit and transmit the results to the remotely located centralized server for real-time decision-making process. The battery allows a portable use of the microfluidic analyser. Due to portability, the microfluidic analyser is suitable for being used in remote locations where there is scarcity of electricity.

Accordingly, the present subject matter describes a compact and deployable microfluidic analyser for automated in-vitro diagnostics for processing biological samples to derive test results without any manual intervention. The microfluidic analyser is capable of self-containment and reagent processing, and waste disposal, thereby eliminating usage of additional and specialized infrastructure. As the microfluidic analyser of the present subject matter is automated, the microfluidic analyser is usable with minimum training requirement.

The microfluidic analyser is further equipped with communication capabilities, utilizing which the microfluidic analyser can share the diagnostics results to a remote location, through a cloud server, for real-time and continuous data analysis. Therefore, the microfluidic analyser expedites the overall processing of the samples in order to achieve optimal clinical outcomes.

These and other advantages of the present subject matter would be described in a greater detail in conjunction with FIGS. 1 to 12 in the following description. The manner in which the microfluidic analyser is implemented and used shall be explained in detail with respect to FIGS. 1 to 12. It should be noted that the description merely illustrates the principles of the present subject matter. It will thus be appreciated that those skilled in the art will be able to devise various arrangements that, although not explicitly described herein, embody the principles of the present subject matter and are included within its scope. Furthermore, all examples recited herein are intended only to aid the reader in understanding the principles of the present subject matter. Moreover, all statements herein reciting principles, aspects and implementations of the present subject matter, as well as specific examples thereof, are intended to encompass equivalents thereof.

FIG. 1 illustrates an exploded view of a microfluidic analyser 100, in accordance with an implementation of the present subject matter. The microfluidic analyser 100 includes a platform 102, an optical unit 104, a linear guide mechanism 106, a fluid control unit 108 coupled to the platform 102. The fluid control unit 108 comprises one or more needles 110, a pneumatic unit 112, and a plurality of control units 114. Further, the microfluidic analyser 100 includes a controller 116, a battery 118, and a display unit 120. The optical unit 104 may include an optical unit bed 122 and an optical sensor 124. The optical sensor 124 may be removably coupled with the optical unit bed 122. In an example, the optical sensor 124 includes a light source (not shown) and a lens arrangement (not shown) for performing emission and collection of a light beam.

The platform 102 is configured to hold at least one cartridge carrying the biological sample and at least one reagent. The at least one cartridge includes one or more sealed ends. The platform 102 may have a plate shaped structure. For example, the platform 102 may be designed to hold at least one cartridge and the platform 102 may allow for a simultaneous analysis of multiple samples contained in the at least one cartridge. The platform 102 may be divided into a set of sections suitable for holding the at least one cartridge. In an example, each section from the set of sections may include a set of slots formed corresponding to the optical sensor 124 to allow the light beam from the optical sensor 124 onto the sample contained in the at least one cartridge.

In an example, the set of sections may include a retaining member (not shown) for locking the cartridges in a specific section, once the cartridge is positioned on the platform 102. The locking of the cartridges by the retaining member prevents an undesired movement of the cartridges while performing a sample analysis process.

In an example, the platform 102 includes a plurality of temperature-controlled zones. The plurality of temperature-controlled zones may be formed for maintaining a desired temperature of the at least one cartridge for pre-treatment of the biological samples in order to prepare the samples for analysis. In an example, the platform 102 includes a heating element (not shown in FIG. 1) to heat the biological sample placed within the at least one cartridge.

For example, the platform 102 may include a nichrome wire-based structure, as the heating element, for electrical temperature management. Further, a set of temperature sensors may be provided corresponding to the temperature-controlled zones for measuring temperature values of the respective zones. The nichrome wire-based structure and the set of temperature sensors may be communicatively coupled to the controller 116. The controller 116, upon receiving measured temperature values from one of the temperature sensors, may precisely adjust the temperature of a corresponding zone by regulating a power delivered to the nichrome wire-based structure.

In an example, the controller 116 includes a communication module (not shown). The communication module may facilitate in establishing a cloud-based connectivity of the microfluidic analyser 100, and thus allowing for cloud connectivity of data being collected by the microfluidic analyser 100 by analysing the biological sample. For example, the controller 116 may include an Internet of things (IoT) module for allowing a remote connection of the microfluidic analyser 100 with a centralized server. The capability of the microfluidic analyser 100 to remotely store the collected data allows for remote classification and distribution of the collected data while ensuring security of the collected data.

In an example, the microfluidic analyser 100 comprises a covering member (not shown in FIG. 1) for covering the platform 102. The covering member may be attached to the platform 102 though a hinge mechanism. In an example, upon placement of a cartridge on the platform 102, the covering member may be actuated to cover the platform 102 from above. The covering member may hold the cartridge in place while performing the sample analysis process. In an example, the covering member includes a plurality of temperature-controlled zones. The plurality of temperature-controlled zones may be formed for maintaining a desired temperature on the cartridge from above and having a function similar to the temperature-controlled zones formed on the platform 102. In an example, the covering member is made of an insulation material.

Further, the linear guide mechanism 106 is arranged below the platform 102 to align the optical unit 104 with the at least one cartridge. The linear guide mechanism 106 may allow a linear movement of the optical unit 104 corresponding to the platform 102. The linear movement of the optical unit 104 with the linear guide mechanism 106 may allow for aligning the optical sensor 124 with respect to the corresponding slots of the platform 102 for performing the analysis of the sample contained in the at least one cartridge.

In an example, the linear guide mechanism 106 includes a drive and a movable member. The drive may actuate a linear movement of the movable member. The movable member may be coupled to the optical unit 104, and the optical unit 104 may be moved linearly in conjunction with the movement of the movable member. Examples of the movable member include, but are not limited to, a belt and pully arrangement, a profiled rail, and a rack and pinion arrangement.

Further, the fluid control unit 108 is configured to regulate flow of the biological sample and the at least one reagent inside the at least one cartridge. The one or more needles 110 of the fluid control unit are aligned with the platform 102 to be able to pierceably connect with the one or more sealed ends of the at least one cartridge. Such connection allows to establish a fluid connection of the one or more needles 110 with the at least one cartridge. Further, the pneumatic unit 112 is operably coupled to the one or more needles 110, to provide at least one of a positive pressure and a negative pressure to the at least one cartridge.

Upon placement of the cartridge on the platform 102, the pneumatic unit 112 may be coupled to the cartridge through the one or more needles 110. The pneumatic unit 112 may provide controlled air pressure to the cartridge. The said air pressure may allow control of a sample or a sample treatment solution present in the cartridge. For example, the air pressure provided by the pneumatic unit 112 may allow movement of the sample and a target sample treatment solution, within the cartridge, towards a target area. Further, the with controlled air pressure, a processed sample may be moved towards a waste containment area. Similarly, an undesired portion of the sample may be moved within the cartridge for isolation and collection.

In an example, the pneumatic unit 112 is configured to open or close an air passage to the cartridge in order to control an ambient pressure inside the cartridge.

The platform 102, linear guide mechanism 106, and the pneumatic unit 112 may be communicatively coupled with the controller 116. The controller 116 may provide control signals in order to precisely control a function of any of the platform 102, linear guide mechanism 106, and the pneumatic unit 112. Further, the controller 116 may be powered by the battery 118. Powering the microfluidic analyser 100 by the battery 118 may allow for a portable usage of the microfluidic analyser 100. In another example, the microfluidic analyser 100 may be powered by an external power source.

In an example, the microfluidic analyser 100 includes a plurality of buttons coupled to the controller 116 and the display unit 120 to display to a user a set of control parameters and status of the microfluidic analyser 100. In an example, the microfluidic analyser 100 may include a touch-sensing display unit 120 which may be used to control the control parameters of the microfluidic analyser 100.

In operation, a cartridge may be placed onto the platform 102 in a designated section of the platform 102. In the present operation described hereinafter, only one cartridge has been taken into account for the sake of brevity. However, the platform 102 may support placement of a plurality of cartridges and may support simultaneous analysis of a plurality of samples. Upon placement of the cartridge, the retaining member of the platform 102 a lock the cartridge in place. Further, the covering member may cover the cartridge from above and provide additional stability to the cartridge. The optical unit 104 is aligned, through the linear guide mechanism 106, with a section on the platform 102 containing the cartridge. Upon successful alignment of the optical unit 104 with the respective section, the controller 116 of the microfluidic analyser 100 may control the temperature of the plurality of temperature-controlled zones for pre-treatment of the sample.

The pneumatic unit 112 may be used to control an air pressure within the cartridge in order to perform pre-processing or pre-treatment of the sample with various reagents contained in the cartridge. The pre-processing of the sample may involve disintegrating a biochemical structure of the sample. Further, the pre-processing of the sample may involve mixing the sample with a washing reagent to remove undesired material from the sample.

In order to perform the above-described pre-processing step, upon placement of the cartridge, at least one outlet of the pneumatic unit 112 may couple with at least one opening of the cartridge. Upon successful coupling of the outlet of the pneumatic unit 112 with the inlet of the cartridge, the pneumatic unit 112 may be automatically controlled by the controller to apply negative or positive pressure. Alternatively, the controller may also control the pneumatic unit 112 to open or close the inlet of the cartridge in order to control an internal pressure of the cartridge, without applying a negative of positive pressure. The operations of the pneumatic unit 112 may be performed by at least one solenoid valves. The said operations may result in the movement of the sample and a target reagent, from amongst the reagents, within the cartridge, allowing the performing of required pre-processing steps.

The optical sensor 124 may incident a light beam onto a sample and collect an emission from the sample generated due to the illumination by the incident light beam. The collection of the emission from the sample may involve detection of biosensors present in the sample. In an example, the biosensors are fluorescence markers, and the sample is marked with the fluorescence markers.

The display unit 120 may be communicatively coupled with the controller and may display a status of the microfluidic analyser 100 and control parameters associated with the microfluidic analyser 100. The display unit 120 may be coupled with a set of buttons for allowing a user to adjust and view different parameters of the microfluidic analyser 100.

Figure 2A:
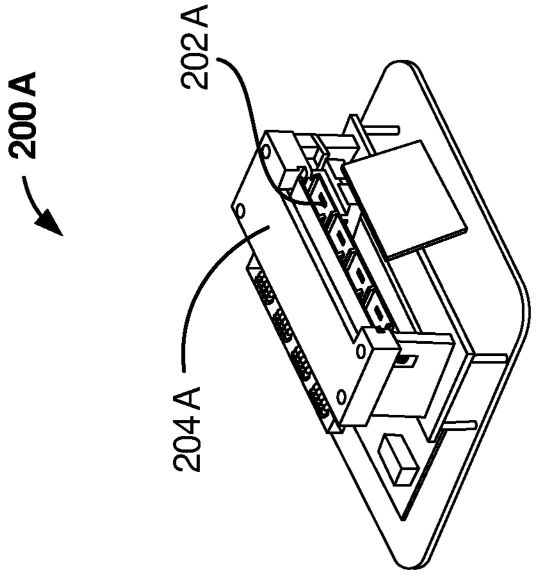
FIGS. 2A, 2B, and 2C illustrate perspective views of a microfluidic analyser, in accordance with different example implementations of the present subject matter.
Figure 2B:
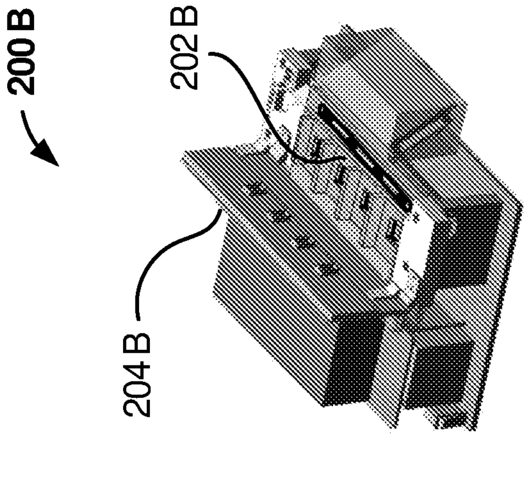
Figure 2C:
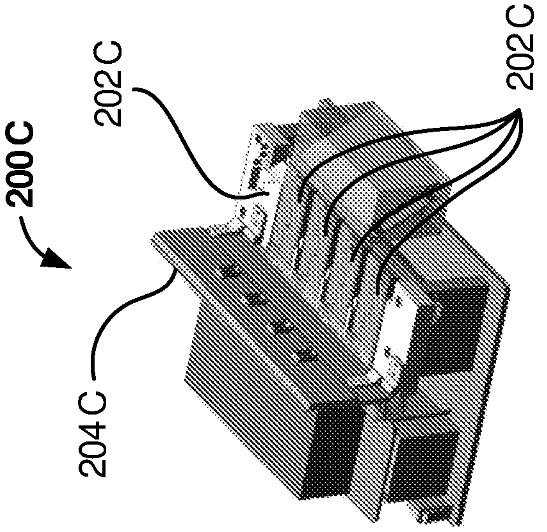

FIGS. 2A, 2B, and 2C illustrate perspective views of a microfluidic analyser 200A, 200B, 200C, in accordance with different example implementations of the present subject matter. The microfluidic analyser 200A, 200B, 200C is similar to the microfluidic analyser 100 of FIG. 1. The microfluidic analyser 200A, 200B, 200C includes a platform 202A, 202B, 202C and a covering member 204A, 204B, 204C coupled to the platform 202A, 202B, 202C. For example, the covering member 204B, 204C is pivotably coupled with the platform 202B, 202C via a set of hinges. Other components of the microfluidic analyser 200A, 200B, 200C are not explained here for the sake of brevity. In an example, the cartridges 206 carrying the biological sample are removably inserted in the microfluidic analyser 200A, 200B, 200C.

Referring to FIG. 2A, the platform 202A may be formed in a manner so as to slidably receive the cartridges. In the present implementation, the covering member 204A may be fixedly attached to the platform 202A through fastening means, such as nut and bolt. Upon reception of the one or more cartridges, the covering member 204A provides a protection to the one or more cartridges from external factors. For example, the platform 202A may be designed as a heating enclosure for forming temperature-controlled zones over the cartridges, as described in detail under the description of FIG. 1.

Referring now to FIG. 2B, in an open configuration, the covering member 204B is substantially perpendicular to the platform 202B, as depicted in FIG. 2B. In the open configuration, the cartridges are not placed inside the sections of the platform 202B. Once the cartridges are loaded or placed on the corresponding sections of the platform 202B, the covering member 204B may be moved at a 90 degrees angle so as to cover a top portion of the platform 202B. As mentioned with respect to FIG. 1, in an example, the covering member 204B may include the temperature-controlled zones to maintain a desired temperature of the biological samples carried within the cartridges.

Referring now to FIG. 2C, the microfluidic analyser 200C is similar to the microfluidic analyser 200B of FIG. 2B. In the open configuration, as illustrated in FIG. 2C, the cartridges 206 are placed inside the sections of the platform 202C. Once the cartridges 206 are loaded or placed on the corresponding sections of the platform 202C, the covering member 204C may be moved at a 90 degrees angle so as to cover a top portion of the platform 202C. The arrangement of the platform 202A and the covering member 204A is described and illustrated in detail under the description of FIG. 4A.

Figure 3A:
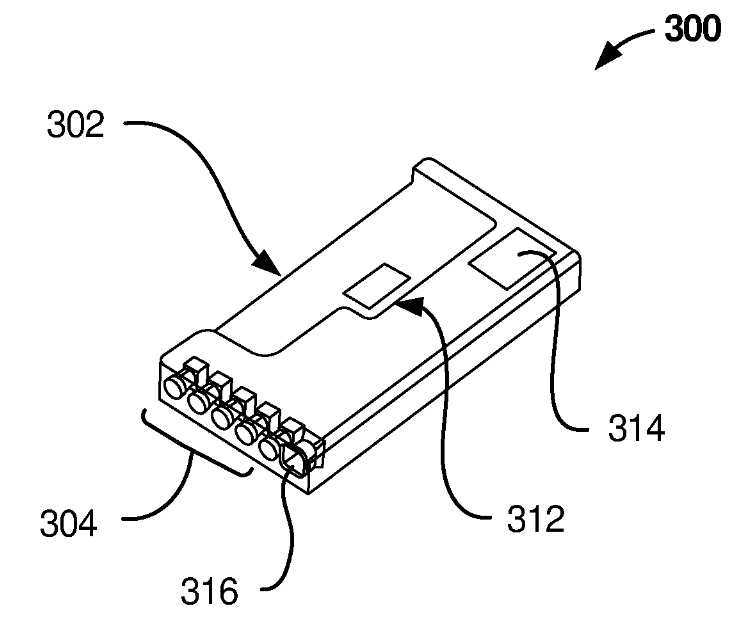
FIGS. 3A and 3B illustrate a perspective view and a sectional view, respectively, of a cartridge, in accordance with an implementation of the present subject matter.
Figure 3B:
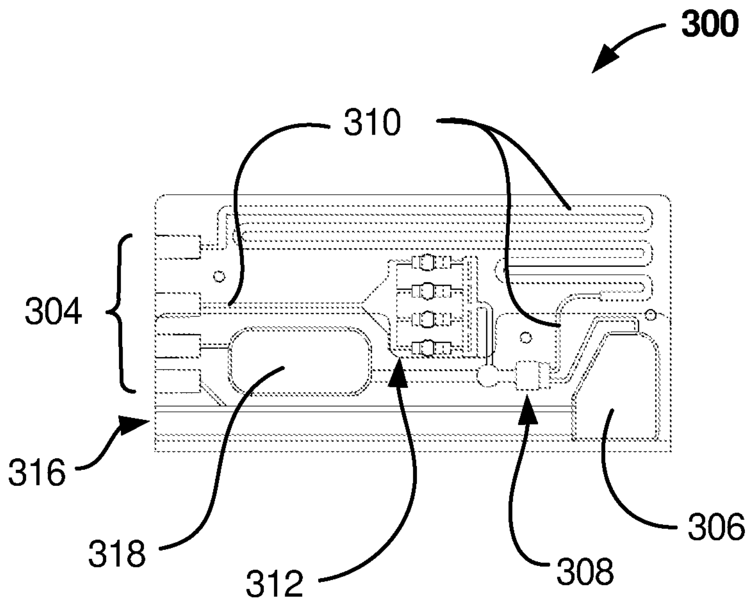

FIGS. 3A and 3B illustrate a perspective view and a sectional view, respectively, of a cartridge 300, in accordance with an implementation of the present subject matter. The cartridge 300 is to facilitate transportation and processing of a biological sample. The cartridge 300 may be a rigid or a flexible structure for holding and carrying the biological sample. In an example implementation, the cartridge 300 includes a body 302, one or more sealed ends 304, a storage chamber 306, a processing chamber 308, a plurality of channels 310, a detection region 312, and an identification marker 314.

The one or more sealed ends 304 of the cartridge 300 may be couplable with a needle assembly of a fluid control unit, such as the fluid control unit 108. In an example, the cartridge 300 includes four sealed ends 304. The one or more sealed ends 304 may be air-tightly sealed in a non-operational state. In an operational state of air inlet, from amongst the one or more sealed ends 304, the air inlet may receive one of a positive pressure and a negative pressure from one of the control valves. Alternatively, opening and closing of the air inlet may be controlled through the control valve. The control of the pressure to the one or more sealed ends 304 and the respective opening and closing of the one or more sealed ends 304 may allow for a movement of the plurality of reagents, treatment solutions, and the sample within different chambers and regions of the cartridge 300.

The body 302 includes an opening 316 for receiving the biological sample. For example, the biological sample may be collected on a swab and the swab is inserted in the cartridge 300 through the opening 316. In an example, the received sample is collected in the storage chamber 306. In the storage chamber 306, the biological sample may be suitably pre-treated and prepared for further processing. In an example, the storage chamber 306 may be provided with a pre-stored solution that enables the pre-treatment of the sample. For example, the pre-stored solution is a buffer solution.

Further, the storage chamber 306 may be coupled to the processing chamber 308 through one of the plurality of channels 310. The processing chamber 308 may include a filtering member to filter the biological sample. In an example, the processing chamber 308 may include multiple filtering members. The processing chamber 308 may be coupled with a treatment media storage. In an example, the treatment media storage may be a serpentine flow channel. The treatment media storage may be pre-stored with a plurality of reagents and treatment solutions. The treatment solutions facilitate in selecting a target biomarker in the biological sample. For example, the treatment solutions may bind with an antibody present in the biological sample, thereby selecting the target biomarker.

Upon completion of pre-treatment of the biological sample, the biological sample may be directed to the detection region 312, by controlling pressure inputs to at least one of the one or more sealed ends 304. Upon reaching the detection region 312, an optical detector of the microfluidic analyser 100 of FIG. 1, may perform a suitable detection process on the biological sample to collect the desired results from the biological sample. In an example, the detection region 312 includes a plurality of optical detection paths. For example, the detection region 312 includes four optical detection paths.

The identification marker 314 may include a Quick Response (OR) code. The OR code may be readable by a OR code reader of an optical unit, such as the optical unit 104. The QR code may allow for an identification of the biological sample contained in the cartridge 300. The identification of the cartridge 300 may allow for proper indexing of the biological samples while preventing inter-mixing of analysis results of different samples.

The cartridge 300 may further include a waste collection chamber 318 to collect residual and processed reagents and the biological sample. The waste collection chamber 318 prevents other chambers to come in direct contact of the residual and processed reagents and sample. Therefore, the waste collection chamber 318 prevents potential contamination of contents of other chambers.

In an example, the cartridge 300 may be formed from plastic. For example, the cartridge 300 may be formed from one of a thermoplastic material, a polypropylene material, a polycarbonate material, a polymethylmethacrylate material, and a cyclic olefin copolymer material.

Although the cartridge 300 has been depicted to include a serpentine shaped channel carrying one or more reagents and a section for holding a buffer solution in which the biological sample is received, the cartridge may have varying configuration and design. Accordingly, the microfluidic analyser of the present subject matter may be configured to operate with cartridges of different sizes and designs.

Figure 4B:
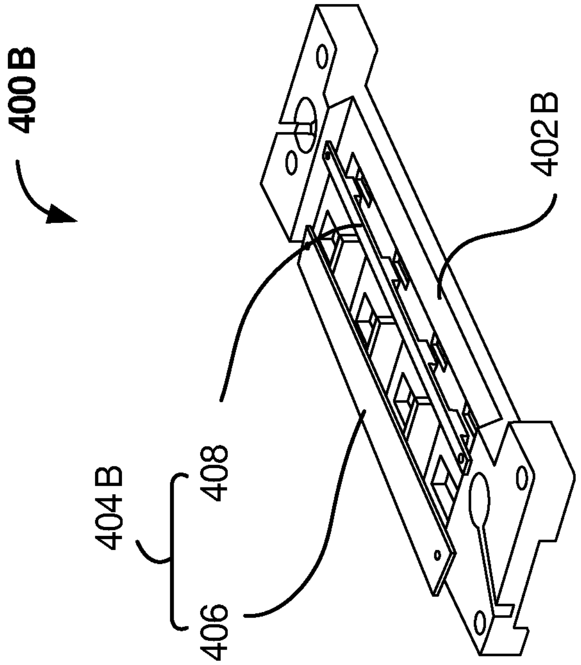
FIGS. 4A and 4B illustrate perspective views of a platform and a cover, in an assembled state, of a microfluidic analyser, in accordance with different example implementations of the present subject matter.
Figure 4A:
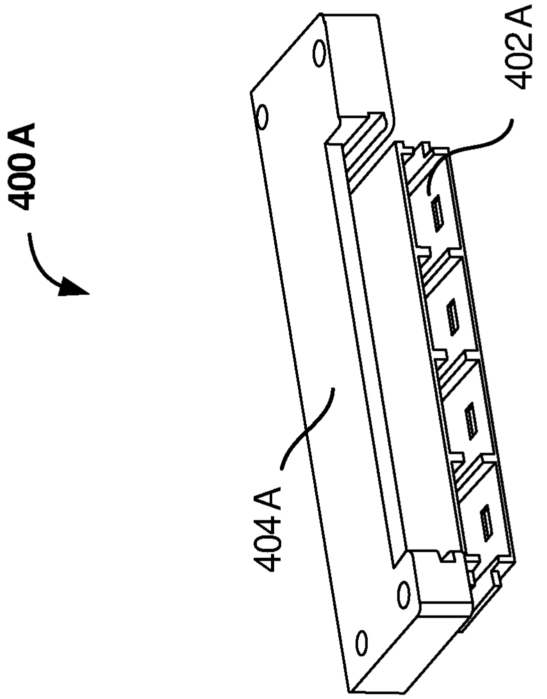

FIGS. 4A and 4B illustrate perspective views 400A and 400B of a platform 402A, 402B and a covering member 404A of a microfluidic analyser, in accordance with different example implementations of the present subject matter. In the present implementation, the platform 402A, 402B may be formed as a heating element for forming temperature-controlled zones over the cartridges, as described in detail under the description of FIG. 1. As depicted in FIG. 4A, the heating element is in the form of an enclosure to surround the cartridges, thereby heating the cartridges from all sides. In an example, the platform 402A may be formed of an aluminium material and the covering member 404A may be made of an insulation material, such as wood and ceramic. The covering member 404A may be fixedly attached to the platform 402A with screw connections. Further, upon coupling of the covering member 404A with the platform 402A, the cartridges may be received by the sections formed on the platform 402A to perform required sample analysis.

In the implementation as depicted in FIG. 4B, the heating element 404B may be in the form of a strip to heat a top portion of the at least one cartridge. In an example, the microfluidic analyser may include a set of heating elements 406 and 408 in the form of strips.

Figure 5A:
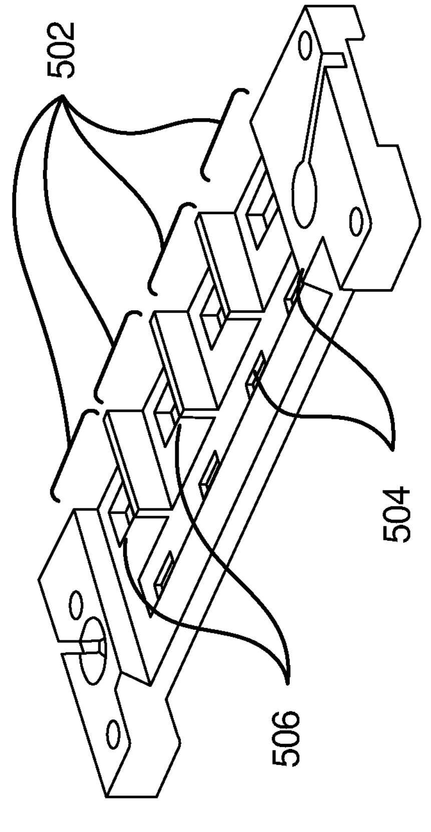
FIGS. 5A and 5B illustrate a perspective view and a top view, respectively, of a platform of a microfluidic analyser, in accordance with an implementation of the present subject matter.
Figure 5B:
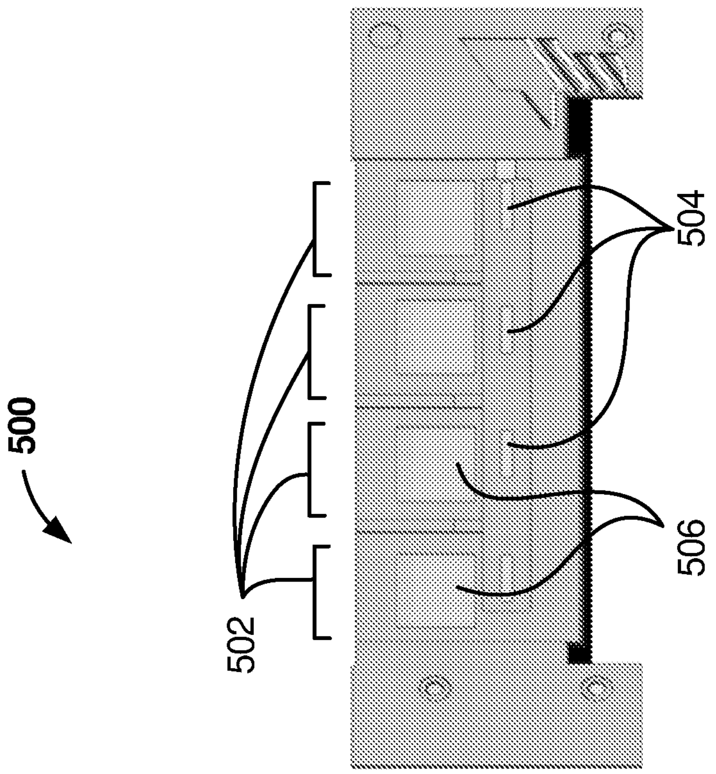

FIGS. 5A and 5B illustrate a perspective view and a top view of a platform 500, in accordance with an implementation of the present subject matter. The platform 500 is similar to the platform 102 of FIG. 1. The platform 500 includes a set of sections 502 for allowing a secure placement of the cartridges. The platform 500 further includes a set of slots 504, 506 formed corresponding to a fluorescent detector and a OR code reader of an optical sensor, respectively, as explained later with respect to FIGS. 8A and 8B, for fluorescent optical readout and cartridge identification using OR code, respectively. In an example, the platform 500 may be fixed to a chassis of a microfluidic analyser (not shown in FIG. 5A) through a snap-fit connection or a screw connection.

In the present implementation, a length of the platform 500 may be in a range of about 290 mm to about 300 mm. For example, the length of the platform 500 is 292.5 mm. Further, a width of the platform 500 may be in a range of about 85 mm to about 95 mm. For example, the width of the platform 500 is 91.22 mm. In addition, a width of each section of the platform 500 may be in a range of about 40 mm to about 50 mm. For example, the width of each section of the platform 500 is 45.1 mm. Also, a height of the platform 500 may be in a range of about 15 mm to about 25 mm. For example, the height of the platform 500 is 19.93 mm.

Figure 6:
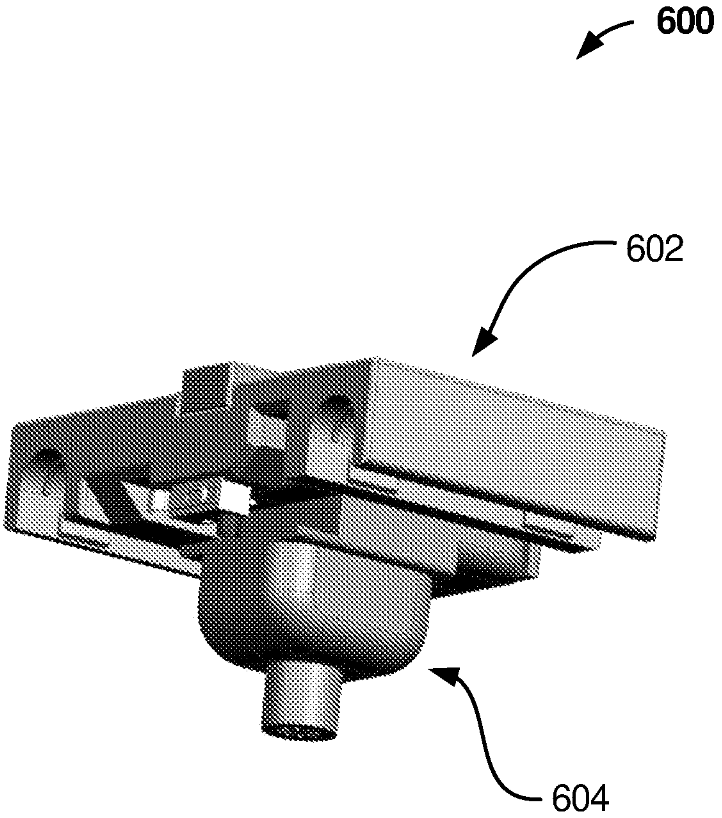
FIG. 6 illustrates a perspective view of an optical unit, in accordance with an implementation of the present subject matter.

FIG. 6 illustrates a perspective view of an optical unit 600, in accordance with an implementation of the present subject matter. The optical unit 600 is similar to the optical unit 104 of FIG. 1. The optical unit 600 may include an optical unit bed 602 and an optical sensor 604 coupled to the optical unit bed 602. The optical unit bed 602 and the optical sensor 604 are similar to the optical unit bed 122 and the optical sensor 124 of FIG. 1. In an example, the optical sensor 604 may be removably coupled to the optical unit bed 602 through a snap-fit connection. In another example, the optical sensor 604 may be coupled with the optical unit bed 602 through a screw connection. In an example, the optical unit bed 602 and the optical sensor 604 may be fabricated as a unibody. In an example, the optical unit 600 comprises a Quick Response (QR) code detector (not shown) to obtain details pertaining to a biological sample held in the at least one cartridge. The OR code detector may facilitate in identification of a sample contained in the at least one cartridge by reading a QR code which may be marked on the at least one cartridge. The identification of the at least one cartridge allows for preventing inter-mixing of analysis results of different samples.

Figure 7:
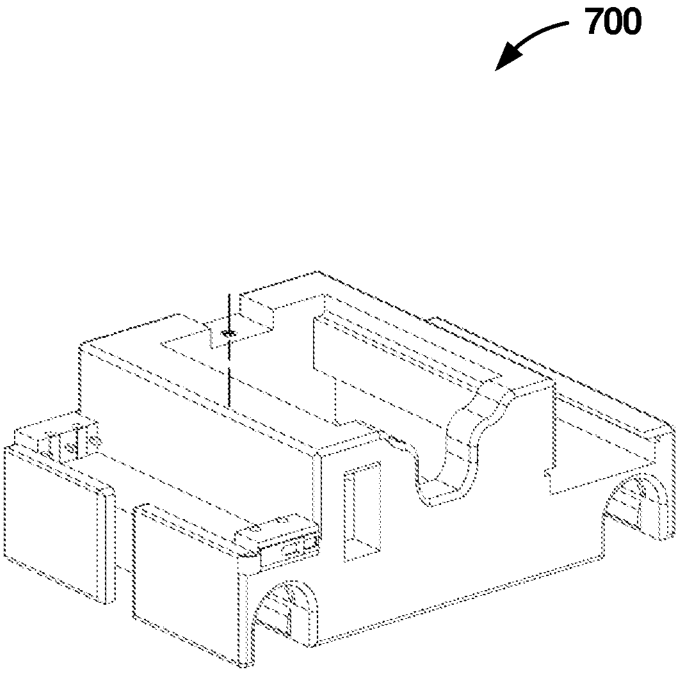
FIG. 7 illustrates perspective view of an optical unit bed of the optical unit, in accordance with an implementation of the present subject matter.

FIG. 7 illustrates a perspective view of an optical unit bed 700, in accordance with an implementation of the present subject matter. The optical unit bed 700 is similar to the optical unit bed 122 as described in FIG. 1. As depicted in the present figure, the optical unit bed 700 includes a set of grooves, holes, and protrusions for coupling with corresponding features of an optical sensor (not shown in FIG. 7). This may allow for a secure coupling of the optical sensor with the optical unit bed 700. The optical unit bed 700 may also include a mount for mounting the optical unit bed 700 on a linear guide mechanism, similar to the linear guide mechanism 106 as described in of FIG. 1.

Figure 8B:
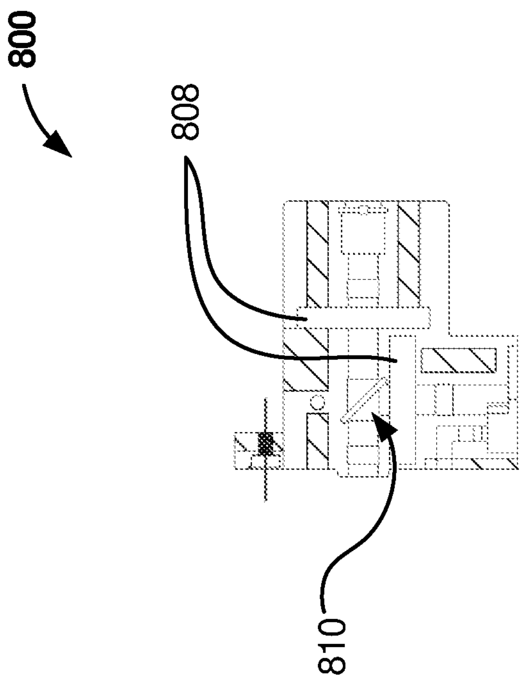
FIGS. 8A and 8B illustrate a perspective view and a sectional view, respectively, of an optical sensor, in accordance with an implementation of the present subject matter.
Figure 8A:
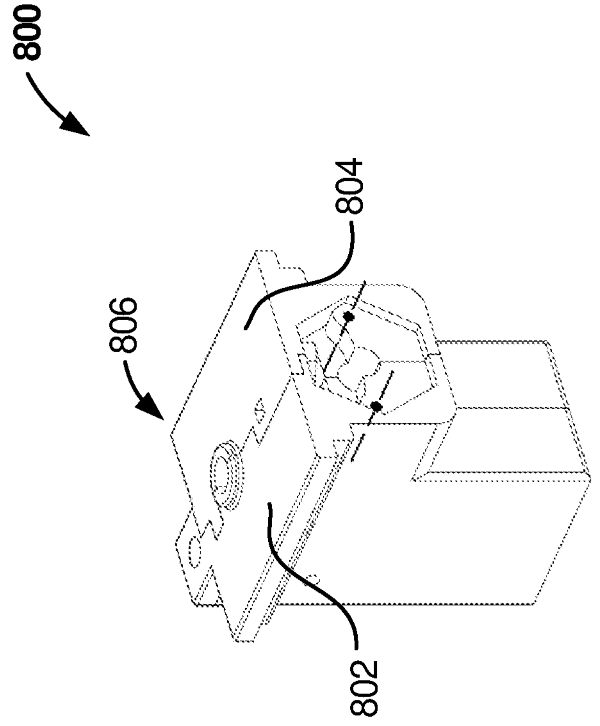

FIGS. 8A and 8B illustrate a perspective view and a sectional view, respectively, of an optical sensor 800, in accordance with an implementation of the present subject matter. The optical sensor 800 may include a first section 802 and a second section 804. In an example, the first section 802 and the second section 804 are made from plastic. The first section 802 and the second section 804 may have complementary profiles for being coupled together. The profiles of the first section 802 and the second section 804 facilitate in forming a snap-fit connection. A length of the optical sensor 800 may be in a range of about 50 mm to about 60 mm. For example, the length of the optical sensor 800 is 55.4 mm.

The first section 802 and the second section 804 when connected with each other, form an enclosure 806. The enclosure 806 may accommodate a fluorescent detector (not shown) and a Quick Response (QR) code detector (not shown). The fluorescent detector may allow for a detection of fluorescence biomarkers in a biological sample. The QR code detector may allow for an identification of a sample contained in a cartridge by reading a QR code which may be marked on the cartridge. The identification of the cartridge allows for preventing inter-mixing of analysis results of different samples.

Further, the enclosure 806 may be formed for precise alignment and assembly of above-mentioned optical components of the optical sensor 800. In an example, upon assembly of the optical components, an internal degree of freedom of the optical components may be restricted to enable long term detection without requirement for calibration. In an example, the optical sensor 800 may be coupled to a controller (not shown) of the microfluidic analyser. The controller may be optimized to minimize a dark current and enable high signal to noise ratio detection through the optical sensor 800.

The optical sensor 800 may be configured for quantification of DNA amplification of the sample contained in the cartridge using a custom optical detector.

As shown in FIG. 8B, the optical sensor 800 includes a set of lenses 808 and a dichroic mirror 810, similar to the dichroic mirror as described in FIG. 1. In an example, the set of lenses 808 includes three bi-focal lens to focus on the biological sample contained in the cartridge, excite the biological sample through a light beam and collect an emission from the biological sample. In an example, the dichroic mirror 810 is arranged to separate the excitation and emission light beams. The optical sensor 800 may also include a set of optical filters (not shown), an excitation filter (not shown), and an emission filter (not shown).

Further, as shown in FIG. 8B, the optical sensor 800 may include a set of placement grooves containing the set of optical filters and the set of lenses 808. The configuration of the placement grooves may be formed according to the application of the optical sensor 800.

In operation, the optical sensor 800 may incident a light beam on a biological sample through the excitation filter. The incident beam, upon passing through the excitation filter may be incident on the biological sample. The optical sensor 800 may accordingly detect fluorescence emission caused by the illumination of the biological sample due to the incident light beam. Such emitted light beam from the biological sample may be passed through the emission filter. The dichroic mirror 810 may be provided to separate the excitation and emission light beams. The fluorescence detection may be used for performing a process of bioassay of the sample.

Figure 9:
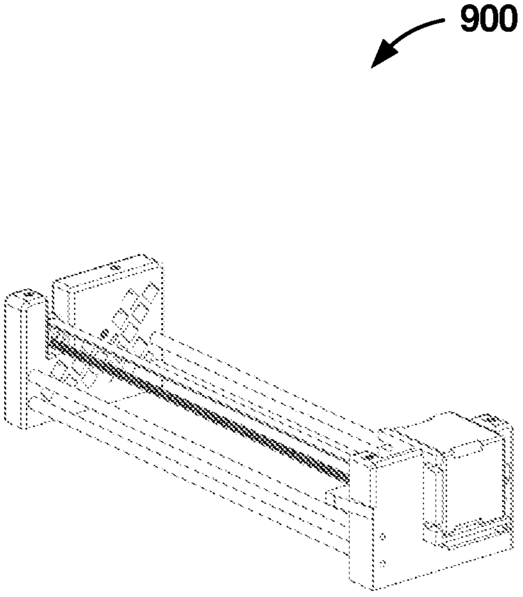
FIG. 9 illustrates a perspective view of a linear guide mechanism, in accordance with an implementation of the present subject matter.

FIG. 9 illustrates a perspective view of a linear guide mechanism 900, in accordance with an implementation of the present subject matter. The linear guide mechanism 900 may be similar to the linear guide mechanism 106 of FIG. 1. The linear guide mechanism 900 may run parallel to the positions of a set of sections of the platform which are used for holding one or more cartridges, as described in the description of FIG. 1. The linear guide mechanism 900 may allow respective movement of the optical unit 600 of FIG. 6 to align with the platform holding the cartridges. Such alignment may be carried out to align corresponding slots of the platform with the optical unit for fluorescence biomarker detection and QR code readout for cartridge identification as described in detail in the description of FIGS. 8A and 8B.

In an example, a length of the linear guide mechanism 900 may be in a range of about 280 mm to about 290 mm. For example, the length of the linear guide mechanism 900 is 288.7 mm. Further, a width of the linear guide mechanism 900 may be in a range of about 85 mm to about 95 mm. For example, the width of the linear guide mechanism 900 is 90.92 mm. In addition, a height of the linear guide mechanism 900 may be in a range of about 60 mm to about 70 mm. For example, the height of the linear guide mechanism 900 is 64.3 mm.

Figure 10:
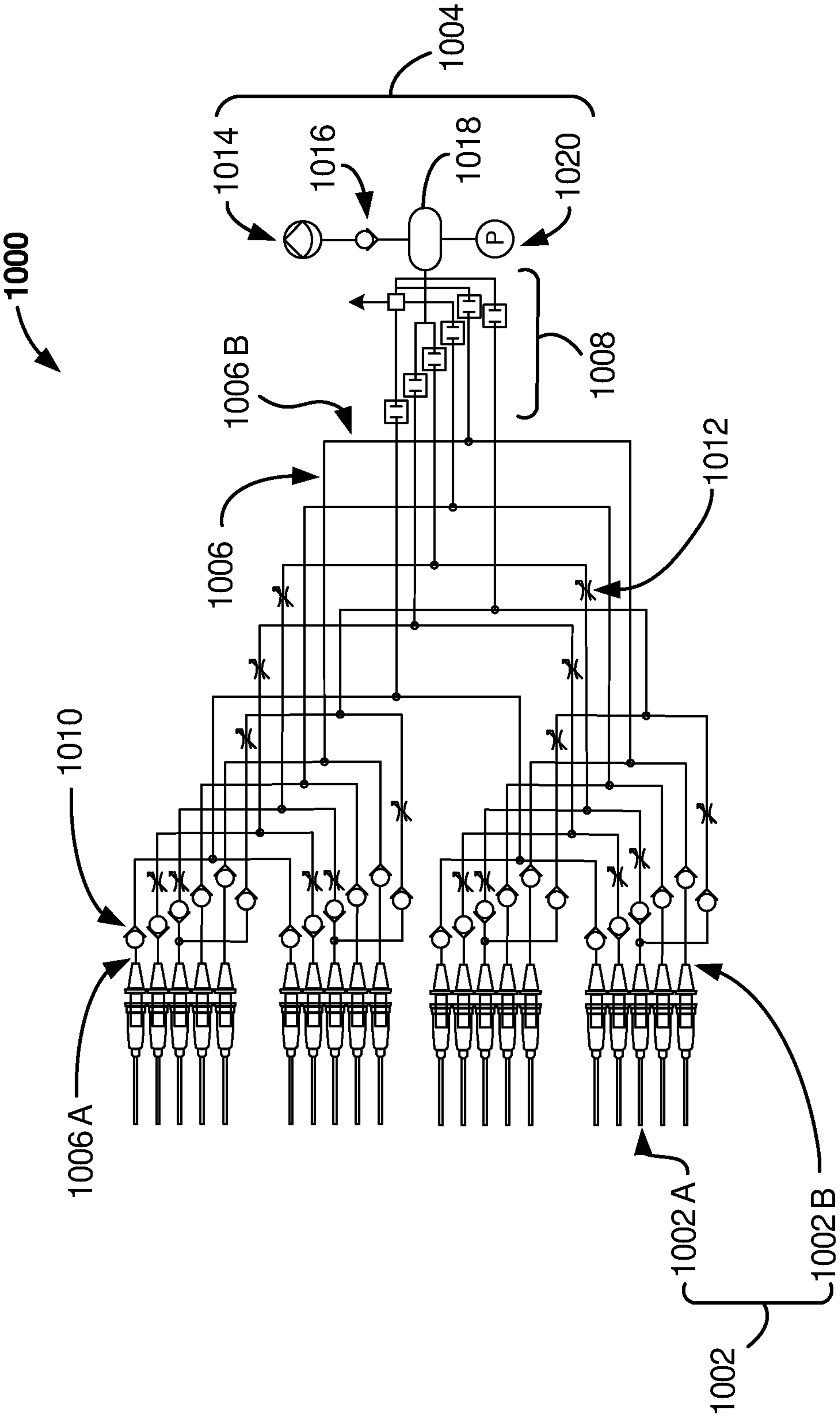
FIG. 10 illustrates a schematic view of a fluid control unit, in accordance with an implementation of the present subject matter.

FIG. 10 illustrates a schematic view of a fluid control unit 1000, in accordance with an implementation of the present subject matter. As mentioned with respect to FIG. 1, the fluid control unit 1000 is coupled to a platform (not shown). For performing a sample analysis process on a biological sample, at least one cartridge, containing the biological sample, is placed on the platform. In an example, the at least one cartridge also includes at least one reagent used for treatment of the biological sample. The fluid control unit 1000 is configured to regulate flow of the biological sample and the at least one reagent.

In an example, the fluid control unit 1000 includes one or more needles 1002 to pierceably connect with one or more sealed ends (not shown in FIG. 10) of the at least one cartridge to establish a fluid connection with the at least one cartridge. For example, a first end of the one or more needles 1002 may pierceably connect with one or more sealed ends of the cartridges placed on the platform. In an example, the sealed ends of the cartridges may form a self-seal with the first end of the one or more needles 1002. Further, the fluid control unit 1000 includes a pneumatic unit 1004 which is operably coupled to the one or more needles 1002. The pneumatic unit 1004 provides at least one of a positive pressure and a negative pressure to the at least one cartridge, through the one or more needles 1002. In an example, the fluid control unit 1000 may also introduce atmospheric pressure inside the at least one cartridge.

The fluid control unit 1000 further includes a plurality of tubes 1006 connected, at a first end 1006A, to a free end 1002B of the one or more needles 1002. In an example, the plurality of tubes 1006 are made of silicon. The fluid control unit 1000 also includes a plurality of control units 1008 which are coupled to a second end 1006B of the plurality of tubes 1006. The plurality of control units 1008 controls the flow of fluid from the pneumatic unit 1004 to the plurality of tubes 1006. For example, a control unit from the plurality of control units 1008 is coupled to an individual tube from the plurality of tubes 1006 to control the flow of fluid in the corresponding tube. In an example, the plurality of control units 1008 are electronically controlled valves, such as solenoid valves.

The fluid control unit 1000 further includes a plurality of check valves 1010. In an example, the plurality of check valves 1010 are mounted between the one or more needles 1002 and the plurality of control units 1008, to allow unidirectional flow of the fluid through the plurality of tubes 1006. In an example, a set of check valves 1010 may allow a flow of the fluid, through the plurality of tubes 1006, from the pneumatic unit 1004 towards the one or more needles 1002. Further, another set of check valves 1010 may allow a flow of the fluid, through the plurality of tubes 1006, from the one or more needles 1002 towards the pneumatic unit 1004. The unidirectional flow of the fluid controlled by the plurality of check valves 1010 may selectively provide a positive pressure or a negative pressure to the at least one cartridge.

The fluid control unit 1000 also includes a plurality of flow control valves 1012. In an example, the plurality of flow control valves 1012 are mounted between the one or more needles 1002 and the plurality of control units 1008. The plurality of flow control valves 1012 regulates the positive pressure or the negative pressure of the fluid provided at the at least one cartridge.

Further, the pneumatic unit 1004 may include a pump 1014, a check valve 1016, a reservoir 1018, a pressure sensor 1020. The reservoir 1018 may carry the fluid and the pump 1014 may be used to control the positive or negative pressure of the fluid in the reservoir 1018. The reservoir 1018 may include an inlet connected to the check valve 1016. The pump 1014 and the check valve 1016 are electronically controlled by a controller (not shown) of the microfluidic analyser to achieve a desired pressure value from the reservoir 1018. Further, the pressure sensor 1020 is coupled to the reservoir 1018 to measure a value of pressure of the reservoir 1018.

Figure 11A:
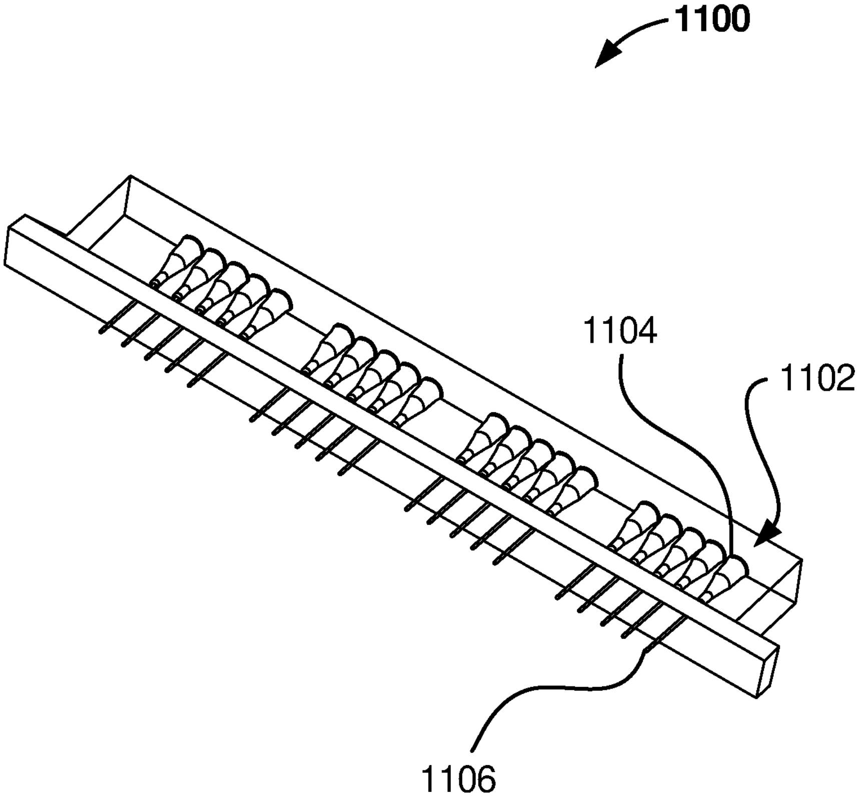
FIGS. 11A and 11B illustrate a perspective view and a side view of a needle assembly, in accordance with an implementation of the present subject matter.
Figure 11B:
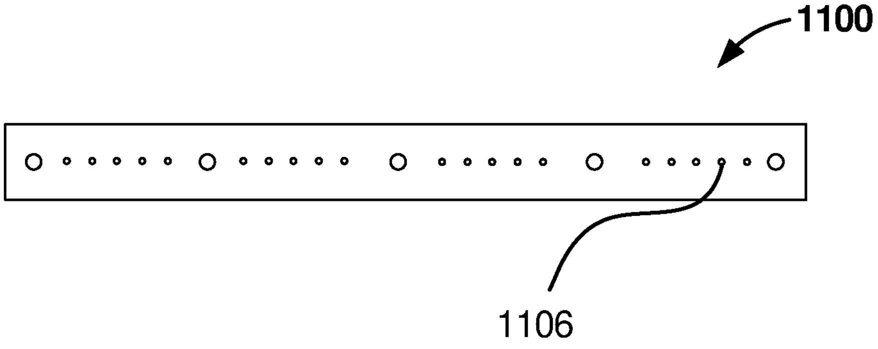

FIGS. 11A and 11B illustrate a perspective view and a side view of a needle assembly 1100, in accordance with an implementation of the present subject matter. The needle assembly 1100 may be coupled to a pneumatic unit, such as the pneumatic unit 1004 of FIG. 10. The needle assembly 1100 may facilitate in distributing a pressure, controlled through a plurality of control units, to a target space. The plurality of control units may be similar to the plurality of control units 1008 of FIG. 10. In an example, the target space may include a cartridge. The needle assembly 1100 may include a one or more needles 1102 to pierceably connect with one or more sealed ends of at least one cartridge to establish a fluid connection with the at least one cartridge (as described under the description of FIG. 1). The one or more needles 1102 are coupled to the plurality of control units as described under the description of FIG. 10. The needle assembly 1100 includes a set of inlet openings 1104. The set of inlet openings 1104 is coupled to the pneumatic unit, as described in detail under the description of FIG. 10. The needle assembly 1100 further includes a set of outlet openings 1106 formed corresponding to the one or more sealed ends of at least one cartridge. The set of outlet openings 1106 is configured to distribute, as per requirement, a pressure applied by a corresponding valve to the cartridge.

In an example, the needle assembly 1100 may include four set of inlet openings and outlet openings. For example, each set of inlet openings and outlet openings includes five needles. The needle assembly 1100 may equally distribute the incoming pressure from the valves to the four outlet openings.

Figure 12:
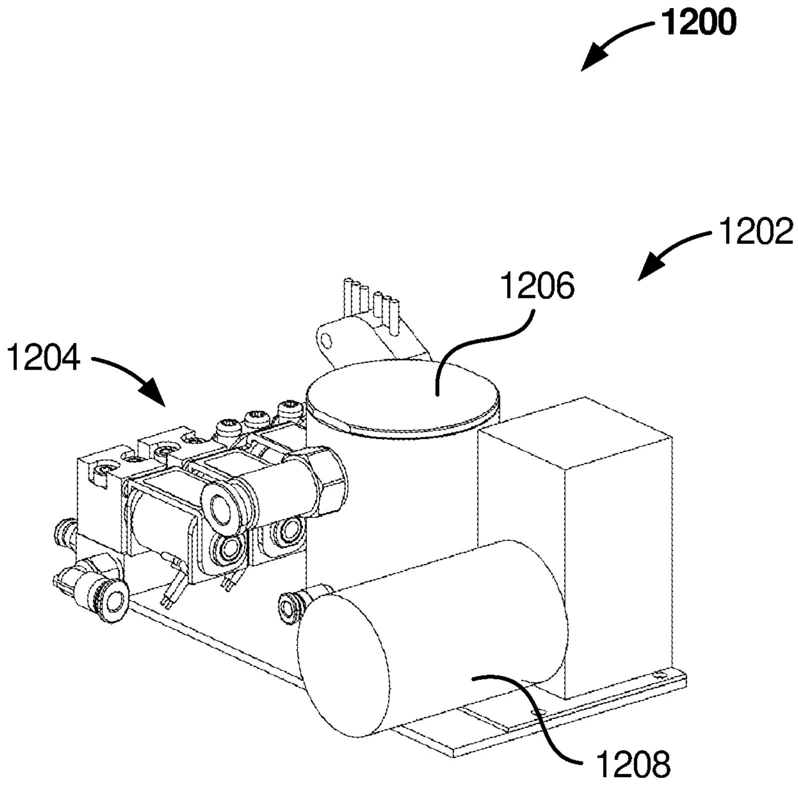
FIG. 12 illustrates a perspective view of an assembly of a pneumatic unit and a plurality of control units, in accordance with an implementation of the present subject matter.

FIG. 12 illustrates a perspective view of an assembly 1200 of a pneumatic unit 1202 and a plurality of control units 1204, in accordance with an implementation of the present subject matter. The pneumatic unit 1202 and a plurality of control units 1204 may be similar to the pneumatic unit 112 and the plurality of control units 114 of FIG. 1. The pneumatic unit 1202 may allow for a pneumatic controlling of liquids, such as the biological sample and various sample treatment solutions. The pneumatic unit 1202 may include a control valve (not shown), a pressure reservoir 1206, and a pump 1208. The plurality of control units 1204 may be used for managing the control of air pressure provide to a cartridge containing a sample. In an example, the plurality of control units 1204 includes a set of solenoid valves.

In an example, the plurality of control units 1204 includes four or more number of valves having dedicated functions with respect to the controlling of the air pressure inside the cartridge. The valves may be configured to perform different operations, such as providing a positive pressure by addition of air in the cartridge, providing a negative pressure by removal of air from the cartridge, and opening and closing of an air passage of the cartridge.

By controlling a combination of the above-described configurations of the valves, a target liquid inside the cartridge can be moved to a specific desired direction or position.

The pump 1208 may control the positive or negative pressure in the pressure reservoir 1206. The pressure reservoir 1206 may include a set of inlets connected to the valves. The pump 1208 and the valves may be electronically controlled by a controller of the microfluidic analyser for achieving desired automation of liquid handling.

In an example, a length of the pneumatic unit 1202 may be in a range of about 135 mm to about 145 mm. For example, the length of the pneumatic unit 1202 is 141.55 mm. Further, a width of the pneumatic unit 1202 may be in a range of about 95 mm to about 100 mm. For example, the width of the pneumatic unit 1202 is 96.7 mm. In addition, a height of the pneumatic unit 1202 may be in a range of about 55 mm to about 65 mm. For example, the height of the pneumatic unit 1202 is 57.03 mm.

Although examples for the present disclosure have been described in language specific to structural features and/or methods, it is to be understood that the appended claims are not limited to the specific features or methods described herein. Rather, the specific features and methods are disclosed and explained as examples of the present disclosure.

We claim:

1. A microfluidic analyser (100, 200A, 200B, 200C) for in-vitro biosensing and analysis of a biological sample, the microfluidic analyser (100, 200A, 200B, 200C) comprising:

a platform (102, 202A, 202B, 202C, 402A, 402B, 500) configured to hold at least one cartridge (300) carrying the biological sample and at least one reagent, wherein the at least one cartridge (300) includes one or more sealed ends (304);

a fluid control unit (108, 1000), coupled to the platform (102, 202A, 202B, 202C, 402A, 402B, 500), configured to regulate flow of the biological sample and the at least one reagent inside the at least one cartridge (300), wherein the fluid control unit (108, 1000) comprises:

one or more needles (110, 1002, 1102) to pierceably connect with the one or more sealed ends (304) of the at least one cartridge (300) to establish a fluid connection with the at least one cartridge (300);

a pneumatic unit (112, 1004, 1202) comprising a pump (1014), operably coupled to the one or more needles (110, 1002, 1102), wherein the pneumatic unit (112, 1004, 1202), the pump (1014), and the one or more needles (110, 1002, 1102) are to provide at least one of a positive pressure and a negative pressure to the at least one cartridge (300), a plurality of tubes (1006) connected, at a first end (1006A), to a free end (1002B of the one or more needles (110, 1002, 1102);

electronically controlled valves coupled to a second end (1006B) of the plurality of tubes (1006); and a plurality of flow control valves (1012), mounted between the one or more needles (110, 1002, 1102) and electronically controlled valves, to regulate at least one of the positive pressure and the negative pressure of the fluid provided at the at least one cartridge (300); and an optical unit (104, 600) operably coupled to the platform (102, 202A, 202B, 202C, 402A, 402B, 500), wherein the optical unit (104, 600) comprises an optical sensor (124, 604, 800) to detect presence of a fluorescence biomarker in the biological sample held in the at least one cartridge (300).

2. The microfluidic analyser (100, 200A, 200B, 200C) as claimed in claim 1, wherein the microfluidic analyser (100, 200A, 200B, 200C) comprises a covering member (204A, 204B, 204C, 404A) to cover the platform (102, 202A, 202B, 202C, 402A, 402B, 500) holding the at least one cartridge (300).

3. The microfluidic analyser (100, 200A, 200B, 200C) as claimed in claim 2, wherein the platform (102, 202A, 202B, 202C, 402A, 402B, 500) comprises a heating element to heat the biological sample placed within the at least one cartridge (300).

4. The microfluidic analyser (100, 200A, 200B, 200C) as claimed in claim 3, wherein the heating element is in the form of an enclosure to surround the at least one cartridge (300).

5. The microfluidic analyser (100, 200A, 200B, 200C) as claimed in claim 3, wherein the heating element (406, 408) is in the form of a strip to heat a top portion of the at least one cartridge (300).

6. The microfluidic analyser (100, 200A, 200B, 200C) as claimed in claim 3, wherein the covering member (404A) is made of an insulation material.

7. The microfluidic analyser (100, 200A, 200B, 200C) as claimed in claim 1, wherein the fluid control unit (108, 1000)

comprises a plurality of check valves (1010), mounted between the one or more needles (110, 1002, 1102) and the electronically controlled valves to allow unidirectional flow of the fluid through the plurality of tubes (1006).

8. The microfluidic analyser (100, 200A, 200B, 200C) as claimed in claim 1, wherein the optical unit (104, 600) comprises a Quick Response (QR) code detector to obtain details pertaining to the biological sample held in the at least one cartridge (300).

9. The microfluidic analyser (100, 200A, 200B, 200C) as claimed in claim 1, wherein the microfluidic analyser (100, 200A, 200B, 200C) comprises a linear guide mechanism (106, 900), wherein the linear guide mechanism (106, 900) comprises a drive and a movable member, wherein the drive actuates a linear movement of the movable member to align the optical unit (104, 600) with the at least one cartridge (300).

10. The microfluidic analyser (100, 200A, 200B, 200C) as claimed in claim 1, wherein the microfluidic analyser (100, 200A, 200B, 200C) comprises a battery (118) to power the microfluidic analyser (100, 200A, 200B, 200C).

11. The microfluidic analyser (100, 200A, 200B, 200C) as claimed in claim 1, wherein the microfluidic analyser (100, 200A, 200B, 200C) comprises a controller (116) to control functions of at least one of the fluid control unit (108, 1000), the optical unit (104, 600), and the linear guide mechanism (106, 900), wherein the controller (116) is to provide control signals to the linear guide mechanism (106, 900) so that the drive actuates the linear movement of the movable member to align the optical unit (104, 600) with the at least one cartridge (300).

12. A microfluidic analyser (100, 200A, 200B, 200C) for in-vitro biosensing and analysis of a biological sample, the microfluidic analyser (100, 200A, 200B, 200C) comprising:

at least one cartridge (300) carrying the biological sample and at least one reagent, wherein the at least one cartridge (300) includes one or more sealed ends (304);

a platform (102, 202A, 202B, 202C, 402A, 402B, 500) configured to hold the at least one cartridge (300);

a fluid control unit (108, 1000), coupled to the platform (102, 202A, 202B, 202C, 402A, 402B, 500), configured to regulate flow of the biological sample and the at least one reagent inside the at least one cartridge (300), wherein the fluid control unit (108, 1000) comprises:

one or more needles (110, 1002, 1102) to pierceably connect with the one or more sealed ends (304) of the at least one cartridge (300) to establish a fluid connection with the at least one cartridge (300);

a pneumatic unit (112, 1004, 1202) comprising a pump (1014), operably coupled to the one or more needles (110, 1002, 1102), wherein the pneumatic unit (112, 1004, 1202), the pump (1014), and the one or more needles (110, 1002, 1102) are to provide at least one of a positive pressure and a negative pressure to the at least one cartridge (300), a plurality of tubes (1006) connected, at a first end (1006A), to a free end (1002B of the one or more needles (110, 1002, 1102);

electronically controlled valves coupled to a second end (1006B) of the plurality of tubes (1006); and a plurality of check valves (1010), mounted between the one or more needles (110, 1002, 1102) and the electronically controlled valves, to allow unidirectional flow of the fluid through the plurality of tubes (1006); and an optical unit (104, 600) operably coupled to the platform (102, 202A, 202B, 202C, 402A, 402B, 500), wherein the optical unit (104, 600) comprises an optical sensor (124, 604, 800) to detect presence of a fluorescence biomarker in the biological sample held in the at least one cartridge (300).

13. The microfluidic analyser (100, 200A, 200B, 200C) as claimed in claim 12, wherein the at least one cartridge (300) comprises:

a processing chamber (308) to filter the biological sample to select a target biomarker associated with the biological sample; and a detection region (312), operably coupled to the processing chamber (308), to detect the target biomarker associated with the biological sample.

14. The microfluidic analyser (100, 200A, 200B, 200C) as claimed in claim 13, wherein the at least one cartridge (300) comprises:

a storage chamber (306), coupled to the processing chamber (308), to receive and pre-treat the biological sample; and a waste collection chamber (318), coupled to the processing chamber (308), to collect residues after processing of the at least one reagent and the biological sample.

15. The microfluidic analyser (100, 200A, 200B, 200C) as claimed in claim 12, wherein the microfluidic analyser (100, 200A, 200B, 200C) comprises:

a linear guide mechanism (106, 900) having a drive and a movable member; and a controller (116) to control functions of at least one of the fluid control unit (108, 1000), the optical unit (104, 600), and the linear guide mechanism (106, 900), wherein the controller (116) is to provide control signals to the linear guide mechanism (106, 900) so that the drive actuates a linear movement of the movable member to align the optical unit (104, 600) with the at least one cartridge (300).

16. The microfluidic analyser (100, 200A, 200B, 200C) as claimed in claim 4, wherein the covering member (404A) is made of an insulation material.

* * * * *